United States Patent
McKenna et al.

(10) Patent No.: US 8,308,573 B2
(45) Date of Patent: Nov. 13, 2012

(54) GAMING DEVICE FOR MULTI-PLAYER GAMES

(75) Inventors: Daniel Bernard McKenna, Vail, CO (US); James Michael Graziano, Hotchkiss, CO (US); George Kauss, San Antonio, TX (US)

(73) Assignee: Lava Two, LLC, Vail, CO (US)

( * ) Notice: Subject to any disclaimer, the term of this patent is extended or adjusted under 35 U.S.C. 154(b) by 329 days.

(21) Appl. No.: 12/675,369

(22) PCT Filed: Aug. 31, 2007

(86) PCT No.: PCT/US2007/077395
§ 371 (c)(1),
(2), (4) Date: Feb. 25, 2010

(87) PCT Pub. No.: WO2009/029107
PCT Pub. Date: Mar. 5, 2009

(65) Prior Publication Data
US 2010/0285875 A1    Nov. 11, 2010

(51) Int. Cl.
A63F 13/00    (2006.01)
G06F 17/00    (2006.01)
G06F 19/00    (2006.01)
A63F 13/12    (2006.01)

(52) U.S. Cl. ............... 463/42; 463/29; 463/39; 463/40; 273/138.2; 273/141 A; 273/454; 273/460; 709/203; 709/205; 709/207; 902/2; 902/23; 902/40

(58) Field of Classification Search ............. 463/16–23, 463/25–33, 39–43; 273/138.1, 139, 138.2, 273/141 A, 454–456, 460; 705/56–57, 64, 705/67, 72, 74–75, 78–79; 709/203–207, 709/FOR. 113; 713/1, 100, 150, 155, 170, 713/176, 182–184, 186–189, 300, 375, 400, 713/500, 600; 902/2–5, 23, 38, 40; A63F 13/00, A63F 13/12, 9/24; G06F 17/00, 19/00
See application file for complete search history.

(56) References Cited

U.S. PATENT DOCUMENTS
5,697,844 A    12/1997    Von Kohorn
(Continued)

FOREIGN PATENT DOCUMENTS
WO    WO-2004084444 A1    9/2004

OTHER PUBLICATIONS

International Search Report in PCT Application Serial No. PCT/US07/077382 dated Apr. 15, 2008, 4 pages.

(Continued)

*Primary Examiner* — Arthur O. Hall
(74) *Attorney, Agent, or Firm* — Patton Boggs LLP (57) ABSTRACT

The present Gaming Device For Multi-Player Games provides the end user with a private bidirectional link to the gaming site to enter their moves, to optionally receive private data from the gaming site to enable the end user's device to display private data that is hidden from the other players, and to communicate privately with another member or members of a sub-group. The Gaming Device For Multi-Player Games comprises a content display for displaying content that is transmitted to the plurality of end users on the unidirectional forward path, a plurality of controls for enabling an end user to generate data for transmission to at least one of the multicasting system and the plurality of end users, and a message display for displaying end user private communications received at the end user device.

18 Claims, 5 Drawing Sheets

U.S. PATENT DOCUMENTS

| | | | |
|---|---|---|---|
| 5,991,410 A * | 11/1999 | Albert et al. | 705/78 |
| 6,447,396 B1 | 9/2002 | Galyean, III et al. | |
| 6,554,712 B1 * | 4/2003 | Takahashi | 463/43 |
| 6,594,498 B1 | 7/2003 | McKenna et al. | |
| 6,681,115 B1 | 1/2004 | McKenna et al. | |
| 6,708,203 B1 * | 3/2004 | Makar et al. | 709/206 |
| 6,954,641 B2 | 10/2005 | McKenna et al. | |
| 6,965,770 B2 * | 11/2005 | Walsh et al. | 455/426.1 |
| 7,413,513 B2 * | 8/2008 | Nguyen et al. | 463/39 |
| 7,480,727 B2 | 1/2009 | Domschitz | |
| 7,502,610 B2 * | 3/2009 | Maher | 455/419 |
| 7,546,118 B2 | 6/2009 | Camp, Jr. | |
| 7,892,097 B2 * | 2/2011 | Muir et al. | 463/42 |
| 8,002,636 B2 * | 8/2011 | Nogami et al. | 463/42 |
| 8,015,595 B2 * | 9/2011 | Benbrahim | 726/4 |
| 2002/0034980 A1 | 3/2002 | Lemmons et al. | |
| 2002/0143901 A1 * | 10/2002 | Lupo et al. | 709/219 |
| 2003/0018970 A1 | 1/2003 | McKenna | |
| 2003/0163482 A1 * | 8/2003 | Bunney et al. | 707/104.1 |
| 2003/0208613 A1 | 11/2003 | Signes et al. | |
| 2004/0002049 A1 | 1/2004 | Beavers et al. | |
| 2004/0031052 A1 | 2/2004 | Wannamaker et al. | |
| 2004/0259633 A1 * | 12/2004 | Gentles et al. | 463/29 |
| 2005/0010653 A1 | 1/2005 | McCanne | |
| 2005/0027648 A1 | 2/2005 | Knowles et al. | |
| 2005/0039210 A1 | 2/2005 | Dusenberry et al. | |
| 2005/0153778 A1 * | 7/2005 | Nelson et al. | 463/42 |
| 2006/0080360 A1 | 4/2006 | Young et al. | |
| 2006/0099981 A1 * | 5/2006 | McKenna et al. | 455/508 |
| 2006/0184977 A1 * | 8/2006 | Mueller et al. | 725/86 |
| 2006/0248013 A1 | 11/2006 | Ebert et al. | |
| 2006/0253601 A1 | 11/2006 | Vedantham et al. | |
| 2006/0259469 A1 | 11/2006 | Chiu | |
| 2007/0113179 A1 * | 5/2007 | Gibbs et al. | 715/530 |
| 2007/0168490 A1 * | 7/2007 | Kent et al. | 709/223 |
| 2007/0174887 A1 | 7/2007 | Hu et al. | |

OTHER PUBLICATIONS

International Search Report in PCT Application Serial No. PCT/US07/077395 dated Sep. 17, 2008, 4 pages.

International Search Report in PCT Application Serial No. PCT/US07/077405 dated Apr. 23, 2008, 4 pages.

International Search Report in PCT Application Serial No. PCT/US07/077409 dated Apr. 18, 2008, 4 pages.

International Search Report in PCT Application Serial No. PCT/US07/077417 dated Apr. 1, 2008, 3 pages.

International Search Report in PCT Application Serial No. PCT/US07/077421 dated Mar. 14, 2008, 4 pages.

International Search Report in PCT Application Serial No. PCT/US07/077425 dated Mar. 17, 2008, 4 pages.

* cited by examiner

GAMING DEVICE FOR MULTI-PLAYER GAMES

CROSS-REFERENCES TO RELATED APPLICATIONS

This application is a national stage of PCT Patent Application No. PCT/US07/077395 filed Aug. 31, 2007, and is hereby incorporated by reference to the same extent as though fully disclosed herein. This application also is related to applications titled "Transaction Management System In A Multicast Or Broadcast Wireless Communication Network" filed concurrently herewith; "Forward Path Multi-Media Management System With End User Feedback To Central Content Sources" filed concurrently herewith; "Forward Path Multi-Media Management System With End User Feedback To Distributed Content Sources" filed concurrently herewith; "Communication Network For A Multi-Media Management System With End User Feedback" filed concurrently herewith; "Gaming System With End User Feedback For A Communication Network Having A Multi-Media Management" filed concurrently herewith; and "Virtual Aggregation Processor For Incorporating Reverse Path Feedback Into Content Delivered On A Forward Path", filed concurrently herewith.

FIELD OF THE INVENTION

This invention relates to a gaming device for multi-player games operating in concert with a Gaming System With Reverse Path Feedback which enables feedback via the reverse path (end user device to network direction) from at least one of a plurality of end users who are capable of influencing, modifying, or changing the delivered multi-media content in the forward path (network to end user device direction) being delivered via a wireless multicast communication network, with each user also receiving private data via a forward path associated with the reverse path.

BACKGROUND OF THE INVENTION

Multi-player games presently operate under the paradigm of a dedicated connection between the player's device and the network, and then the gaming application. This dedicated connection could be wired or wireless, and could also be physical or logical in its connection state. However, there is no delivery efficiency of the modified "game screen" in the forward path direction (network to end user), since each end user receives this information in a one-to-one fashion. Even a multicast on the wired Internet is really just a unique connection to each device. There are no economies of scale in the delivery of multi-player gaming information.

A terrestrial wireless network can deliver multi-media content to more than one end user or subscriber at the same time, thereby realizing high levels of network efficiency. The terrestrial wireless network delivery method is called broadcast, multicast, or narrowcast and has at least one end user (subscriber) and associated end user device receiving the broadcasted content, and thereby derives its high efficiency when more than one end user receives the same content in a simultaneous fashion. Key advantages of terrestrial wireless networks are high bandwidth and high capacity; and the wireless network is targeted in its delivery, both geographically and demographically. Yet this sharing of the forward path is not done in multi-player gaming. While the multicast process is well taught in the art, the delivered multi-media content, information, or data (collectively termed "content" or "multi-media content" herein) is static in nature and is simply a replica of the source content, less any transmission or coding errors. The wirelessly multicast source content is immutable and does not have end user interaction or feedback.

New wireless multi-media content delivery architectures, such as MediaFLO ("Media ForwardLinkOnly") and DVB-H (Digital Video Broadcast-Handheld), function by using a broadcast architecture in the forward path to produce a pseudo-multicast delivery and concurrently disseminate multi-media content to a plurality of wireless end user devices on a single air interface channel. In these architectures (also termed "multicast" herein), a unidirectional multi-media wireless broadcast network transmits multi-media content to selected authorized wireless end user devices in a time concurrent fashion. However, there is no interconnection, interaction, or feedback between the end users and their associated end user devices with this multicasted multi-media content stream. The forward path content is completely and totally static in its nature. The delivered multi-media content is essentially no different than UHF or VHF broadcasted television, other than it can be received on small portable digital devices.

The MediaFLO and DVB-H multi-media wireless architectures, therefore, are static in their user interface, since there is no interactivity or feedback between delivered multi-media content and the end user. The multicasted content is invariant or immutable in its extent. That is, whatever is delivered to the wireless network for transmission to the end user population is delivered as an exact replica, untouched and unmodified from its original form. This is a distinct and inherent limitation of the present wireless multicasting art (even though the multicasting paradigm is efficient and targeted).

Thus, the state of the wireless multicasting art does not enable or permit end users, via their associated end user devices, to dynamically modify the multi-media content delivered on the forward path via aggregated feedback or input from at least one of a plurality of end users via their associated end user devices. No system heretofore has envisioned engaging the end user to directly and actively influence the delivered multicasted content.

BRIEF SUMMARY OF THE INVENTION

An advance is realized over the present wireless multicasting art with the Gaming System With Reverse Path Feedback, which enables a reverse path feedback architecture, wherein the forward path multicasted content can be dynamically modified as a result of end user interaction or feedback. In addition, the present Gaming Device For Multi-Player Games provides the end user with a private bidirectional link to the gaming site to enter their moves, optionally receive private data from the gaming site to enable the end user's device to display private data that is hidden from the other players, and communicate privately with another member or members of a sub-group. The Gaming Device For Multi-Player Games comprises a content display for displaying content that is transmitted to the plurality of end users on the unidirectional forward path, a plurality of controls for enabling an end user to generate data for transmission to at least one of the multicasting system and the plurality of end users, and a message display for displaying end user private communications received at the end user device.

In the Gaming System With Reverse Path Feedback architecture, end user devices share a common wireless forward path of a multicast communication architecture in which the forward path delivered content is dynamically changed or modified based on a real-time, near-real-time or delay-time basis via aggregated reverse path feedback from at least one of a plurality of end user devices. The Gaming System With Reverse Path Feedback periodically or continuously aggregates the feedback inputs received via the reverse path (having wired and/or wireless connectivity), modifies the forward path multi-media content, and delivers this dynamically modified multi-media content to the then connected population of end user devices via a wireless forward path multicast in a repetitive closed loop fashion.

The Gaming System With Reverse Path Feedback aggregates the reverse path feedback from the end user device or devices and then processes this feedback data in context with the streamed forward path content. For example, if the application is a multi-player game, the Gaming System With Reverse Path Feedback receives the end user's reverse path feedback data which defines how their avatar or in-game virtual person should react or behave at a given point within the game. This feedback is sent to the Gaming System With Reverse Path Feedback via wired or wireless means. The Gaming System With Reverse Path Feedback, in this gaming example, aggregates and delivers the "combined feedback" of all the connected end users for that moment in time to the gaming software application. The gaming software application then modifies its streamed forward path content according to the latest "combined feedback". The wireless multicast network then delivers the latest video frames or sequence of successive game image frames of the game session (to include sound) to the participating end users based on the "combined feedback". The wireless multicast can be delivery targeted to regionally or locally grouped end user sub-populations to enhance the overall network efficiency. This process repeats in a continuous fashion, with continuous N+1 events of "combined feedback" delivered to the software application, which in turn modifies the streamed forward path content.

The Gaming Device For Multi-Player Games solves a complex problem resident in existing telecommunication architectures by providing both a content display for displaying content that is transmitted to the plurality of end users on the unidirectional forward path as well as a plurality of controls and a message display for enabling an end user to generate data for transmission to at least one of the multicasting system and the plurality of end users, and to display end user private communications received at the end user device, thereby facilitating multi-player team play.

DETAILED DESCRIPTION OF THE INVENTION

Gaming Representative Architecture

Figure 5:
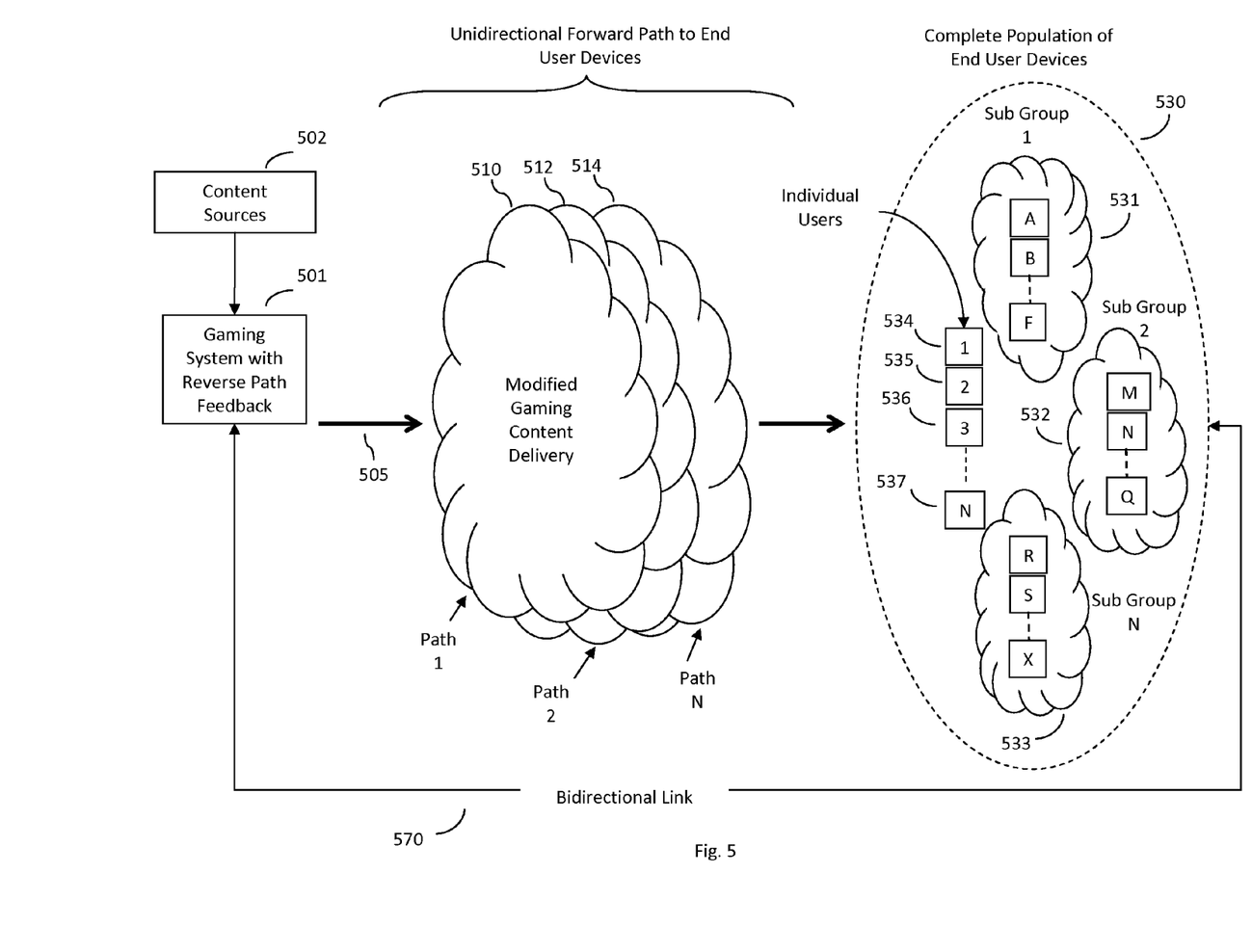
FIG. 5 illustrates a logical gaming application.

FIG. 5 illustrates, in a broad perspective macro block diagram form, how a typical gaming application might be architected. For this example description, the card game of blackjack gambling is used; however, nothing in this example description limits the applicability of the described concepts to other applications with similar attributes.

At Gaming System With Reverse Path Feedback 501, the reverse path feedback data is aggregated from reverse path 540. The data coming into Gaming System With Reverse Path Feedback 501 originates from end user devices located on the right side of FIG. 5, shown as squares with alpha or number designators (to be discussed more later in this section). This feedback data could be instructions such as: "I'll take another card" or "I want to double down" or "I fold and am out for this game only" or "I am done playing entirely". For blackjack, the "dealer" is a software application residing as an external network connected device 502, called Application. This software application 502 responds to the feedback data collected by Gaming System With Reverse Path Feedback 501 and then creates and provides modified content via connection 505 to forward paths 510, 512, and 514 Likewise, any other application, be it multi-player gaming or the like, would operate in a similar fashion.

Nothing herein limits what form forward paths 1, 2, and N, respectively 510, 512, and 514, take. Thus, forward path 510 could be WiFi, forward path 512 could be MediaFLO, and forward path 514 could be cellular, each of which comprise an air interface for the forward path. Forward paths 510, 512, and 514 can also be characterized as a physical delivery region, or can be characterized as a combined physical and logical delivery region/method, respectively, or just a logical delivery method. If forward paths 510, 512, and 514 are logical delivery paths, then the delivery methodology is related to pairing of end users with a given forward path's content, where the end users have like interests independent of physical location. The actual physical delivery regions of these forward paths could be highly varied and diverse. For example, forward path 510 may just be a single narrowcast to a neighborhood in a city on a Caribbean island where electronic gambling is legal. In contrast, forward path 512 could be to all the major gambling areas in the world to include, but not be limited to: Las Vegas, Atlantic City, river boats on the Mississippi, cruise ships on the ocean, casinos on tribal lands, the French Riviera, Monaco, and so on. For forward path 512, since it is covering so many diverse geographic regions, the air interface of the forward path, be it WiFi, DVB-H, or MediaFLO, can vary; and nothing herein limits what method is used to deliver the reverse path modified content on the forward path. Finally, forward path 514 might be to all college campuses in the state of Nevada that have more than 2000 students.

The modified forward path content is sent via connection 520 which, as already discussed, could take the form of a variety of wireless air interfaces. The Population 530 comprises the complete set of then connected Players or End Users and their associated End User Devices. Within this Population 530 of the then connected end user devices, Sub-Populations 531-533 are present. These Sub-Populations 531-533 may be geographically concentrated to enable an efficient forward path multicast, narrowcast, or broadcast delivery; or these Sub-Populations 531-533 may be defined as the set of all Players or End users that are blackjack aficionados (i.e., a logical grouping). Again, this latter description is more logical in its extent. Thus, Sub-Populations 531-533 may be logically based on demographics, for example, physically based on location, or the Sub-Populations 531-533 could be a combination of each "grouping methodology". For instance, in Sub-Population 531, end user devices A and B may be in the same geographic region as end user devices M and N in Sub-Population 532, and so a single physical air interface narrowcast (WiMax, for example) is set up to deliver the modified forward path content to end user devices A, B, M, and N, since they are geographically close or in some air interface proximity to each other and within the coverage region of the WiMax cell.

Alternatively, Sub-Populations 531-533 could all be geographically defined, and the logical grouping of those end users interested in blackjack has already been defined by the system. In this case, three multicasts would be set up to deliver modified forward path content to these three geographic regions. Individual Users having end user devices 534, 535, 536, and 537, the Nth device, would each have their own physical air interface connection to the modified forward path content.

In aggregate, the entire Set or Population 530, in some pre-specified timeframe, provides feedback via reverse path 540 to Gaming System With Reverse Path Feedback 501, all in a continuous fashion until a given blackjack game is complete, when a new game is started, or when the scheduled time for blackjack is over, for example.

End User Device Process Flow

Figure 3:
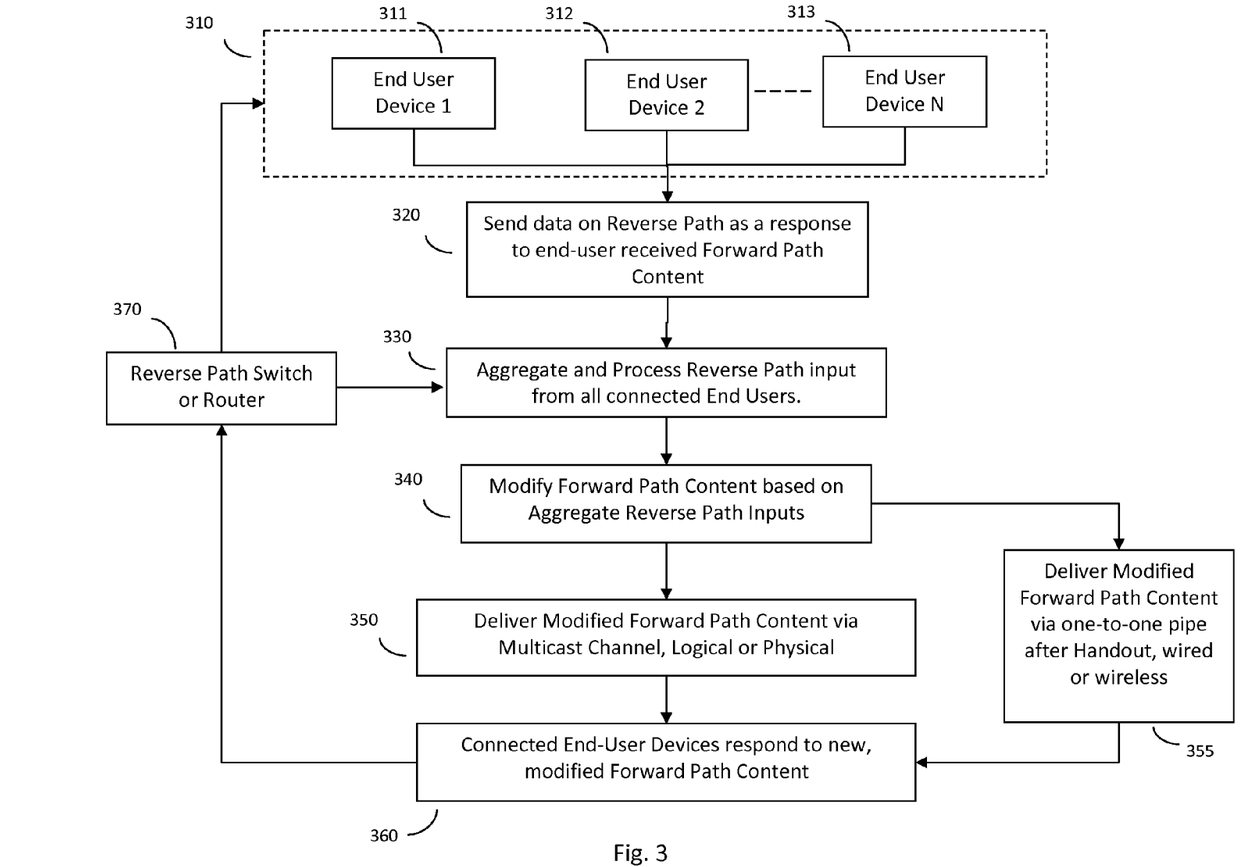
FIG. 3 illustrates, in flow diagram form, the macro process steps that the Gaming System With Reverse Path Feedback takes to complete a continuous forward path modification cycle.

FIG. 3 illustrates, in flow diagram form, the macro process steps that the Gaming System With Reverse Path Feedback takes to complete a continuous forward path modification cycle. At entire population 310, End User Device One 311, along with End User Device Two 312 and End User Device "N" 313, are connected to step 320.

At step 320, in this example, the end user responds to the most recent forward path content, such as the display on a hand-held video game, and initiates a reverse path communication via their end user device, such as how to move their avatar in an action game. At step 330, the system receives and processes the reverse path input from the then connected end user devices. Step 330 would also implement steps to insure time coherency in the aggregated responses.

At step 340, the forward path content, still to be delivered back to the connected population, is modified. Thus, in this gaming application, the next frame (or number of frames) of the game is modified based on the collectively aggregated reverse path input.

At step 350, the game video and audio is delivered via a shared forward path via wireless broadcast, multicast, or narrowcast means. The delivery can be via physical grouping, logical grouping, or a combination of the two forms of grouping. At step 355, the game video and audio is delivered via a one-to-one communication means, either wired or wireless.

At step 360, the feedback loop starts again where the end users, via their end user devices, begin to respond to the new video and audio being displayed on their end user devices. Step 360 connects to step 310 in a continuous fashion until the game is complete or some other decision for game termination is realized, such as a time or date.

Forward Path Multi-Media Management Physical Network

Figure 4:
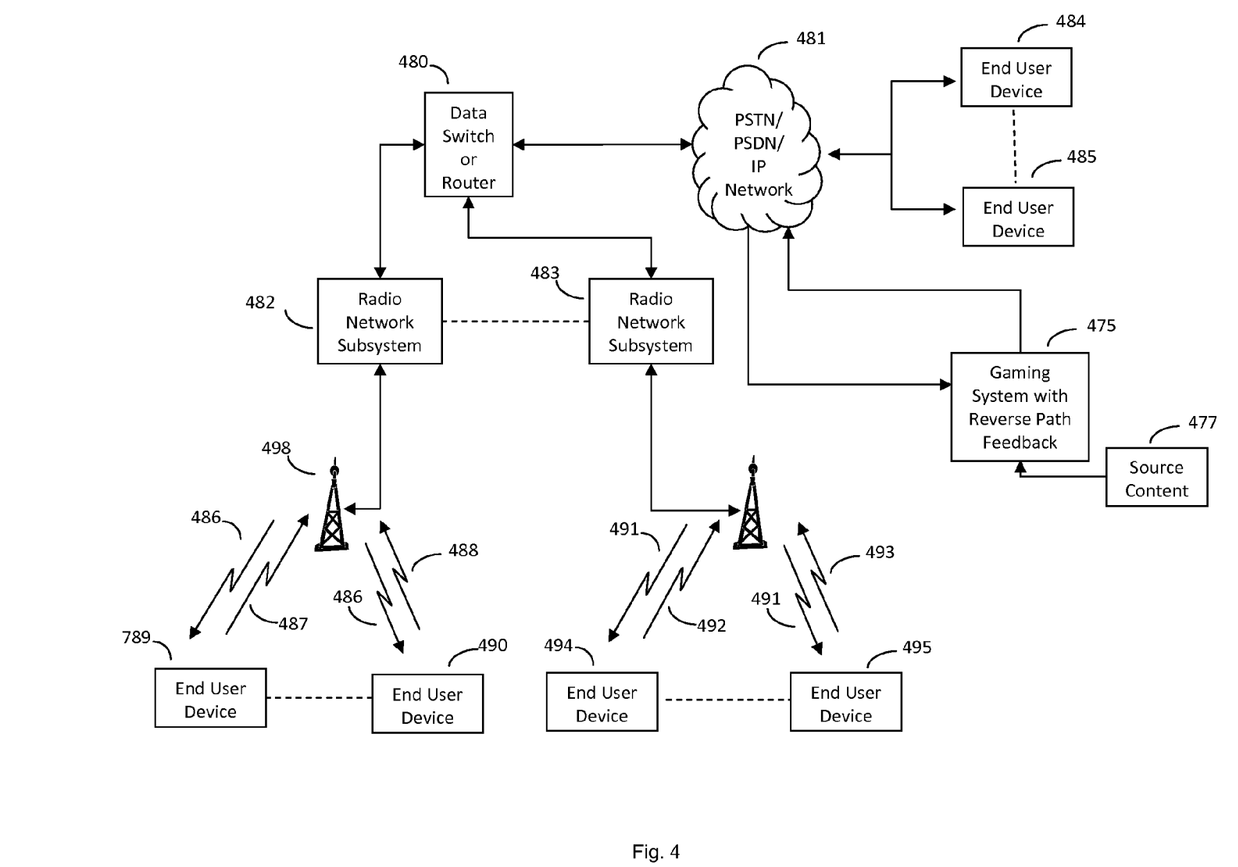
FIG. 4 illustrates an example of a physical wireless network with reverse path modification of the forward path.

FIG. 4 illustrates one embodiment of a physical implementation of the wireless network to effect a Gaming System With Reverse Path Feedback. In FIG. 4, a cellular network is depicted, but other network architectures are capable of realizing Gaming System With Reverse Path Feedback functionality. Other network types include: MediaFLO, WiFi, WiMax, satellite, Bluetooth, UWB, and so on. Of note, certain cellular building blocks are not shown for concept clarity; the devices not shown include, but are not limited to: Home Location Register (HLR), Visitor Location Register (VLR), Mobile Switching Center (MSC), Packet Data Switch Network (PDSN), and so on. The function and interconnection of these devices is well known in the art.

Radio Network Sub-System 482 and Radio Network Sub-System 483 are shown, and these Radio Network Sub-Systems could be CDMA or TDMA for their RF access protocol; they could be 3 G or 3.5 G in their deployment lifecycle. The frequencies could be 800 MHz or 2 GHz. Each Radio Network Sub-System serves a unique geographic region. Cell site 498 serves end user devices 489 through 490, and cell site 499 serves end user devices 494 through 495.

Cell site 498 could be omni-directional in its coverage extent, while cell site 499 could be sectorized in its coverage. Further, end user devices 489-490 are grouped together because they are receiving a common multicast from Radio Network Sub-System 482 via cell site 498 along RF forward path 486 Likewise, end user devices 494-495 are receiving a common multicast from sectorized cell site 499 via RF forward path 491. However, on the reverse RF path, end user device 489 communicates via RF pathway 487 while end user device 490 communicates on the reverse path via RF pathway 488; and end user device 494 communicates on reverse path 492 while end user device 495 communicates via reverse path 491.

In a process well understood in the art, a mobile device (end user device) could move from sectorized cell site 499 to omni-directional cell site 498 and retain seamless coverage via the hand-off or hand-over process. Hand-offs can be hard, meaning the previous signal is dropped before the new signal is acquired, or they can be soft, where both cell sites 498 and 499 would have communication for a period of time until the hand-off is completed. Separately, within the sectored cell site 499, a "softer" hand-off process can occur wherein the end user device operates on two adjacent coverage sectors of cell site 499 at the same time.

To initiate a forward path modification sequence, a content modification signal is sent across the physical network. Tracing the path of one example reverse path signal, end user device 489 would communicate via reverse path 487 to cell site 498, which then communicates with Radio Network Sub-System 482. Radio Network Sub-System 482 then communicates with data switch/router 480 to the network 481. Network 481 contains all the typical networking formats to include Public Telephone Switched Network (PSTN), Public Switched Data Network (PSDN), and an Internet Protocol Network (IP Network). In addition, while not shown, other protocols that are more suited to a mobile architecture, such as IPv6, may be deployed.

The network 481 is connected to end user devices 484 and 485 via a more traditional wired paradigm. Gaming System With Reverse Path Feedback 475 is connected to network 481, and Gaming System With Reverse Path Feedback 475 receives reverse path modification information from all the then connected end user devices and processes the data in a manner described herein. The Source Content site 477 delivers content to Gaming System With Reverse Path Feedback 475; content can be multi-media or any other data form that has relevance to the subscriber population or sub-population. After the Gaming System With Reverse Path Feedback has performed its operations, it forwards the modified forward path content back to network 481. Network 481 then communicates to router 480, then radio network subsystem 482 and cell site 498 finally transmit the modified forward path content via RF path 486 to end user devices 489-490, respectively. This process repeats in a cyclical fashion, starting with reverse path modification information to the Gaming System With Reverse Path Feedback 475, which then modifies the forward path content, on a frame-by-frame basis if video, and then back to the end user devices.

End User Device

Figure 1:
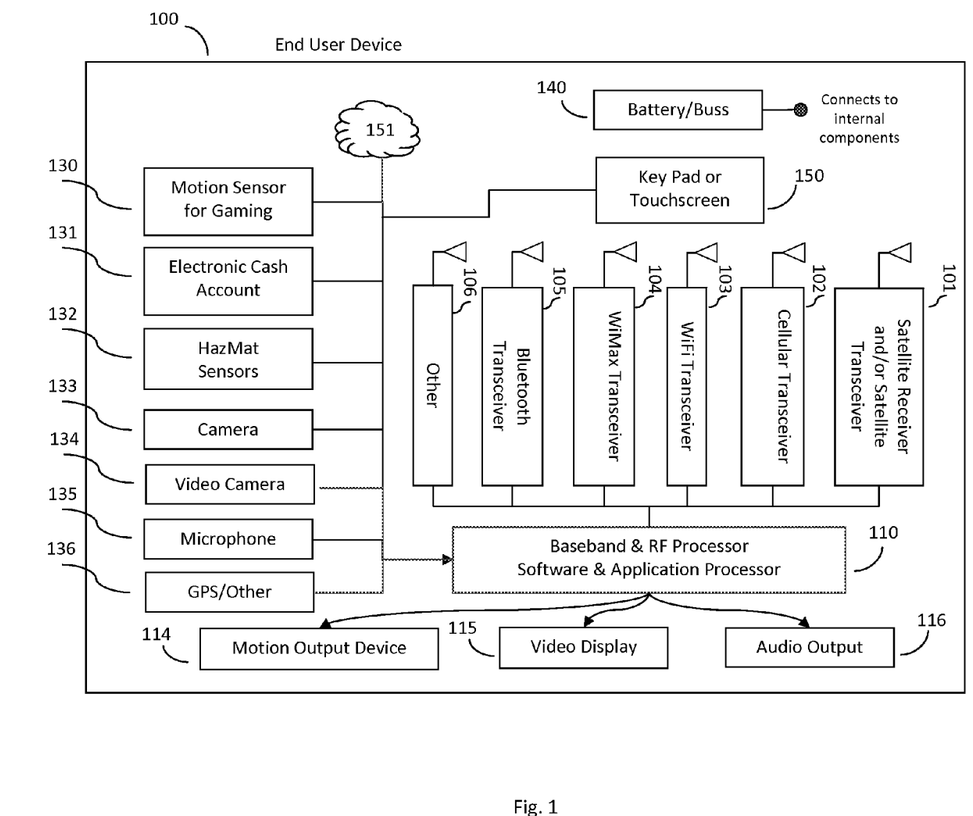
FIG. 1 illustrates, in block diagram form, a typical end user device.

FIG. 1 depicts a block diagram of one embodiment of an end user device. This particular embodiment 100 has multiple means to communicate, as well as numerous means to provide input to ultimately modify the forward path. The description of this device is likely more encompassing than would be for a typical end user device. The description contained herein is meant to show what is possible.

End user device 100 is capable of receiving content multicasts, broadcasts, or narrowcasts on the forward path. End user device 100, either in an autonomous mode or via end user action, then is capable of communicating, in the reverse path direction, end user initiated content which could be complete in its nature or could be used (in aggregate) to modify the next few frames of a video game, for instance, after processing by the Gaming System With Reverse Path Feedback.

The central portion of end user device 800 is baseband and RF processor 110, which also contains an application processor with associated software/firmware. Baseband and RF processor 110 manages the operation of end user device 100 by collecting input from input devices 130-135 and 150, communicating via devices 101 through 106, and outputting content, information, and data via devices 114-116. Baseband and RF processor 110 contains typical elements, such as a microprocessor with associated memory and firmware, as well as loadable software. Input devices 130-135 are internally connected to relevant internal components via internal local network 151. They communicate directly with baseband and RF processor 110.

Device 130 is a motion sensor which could be used for gaming. This device has sensors for acceleration and/or motion; the data collected could be relative or absolute. Device 131 is an electronic cash account which provides for a secure means to store cash or cash equivalents on end user device 100 to include a means to send or receive cash or cash equivalents. The electronic cash account could be used to pay for accessing forward path modified content. This sub-device could also be an electronic credit card or some other electronic payment means like PayPal™.

Device 133 is a digital camera. Device 134 is a digital video camera. Device 135 is a microphone for audio input. Again, as previously described, all of the input sub-devices 130-135 are internally connected within end user device 100 via local network 151; sub-devices 130-135 also receive power and other signaling via 140, battery/buss. Device 150 is a keypad or touch-screen. This is an input device connected to internal network 151. Communication devices 101-106 are generally wireless in nature, but communication device 106 could be wired. As previously discussed, most end user devices would not have this many methods to communicate; rather, the end user device would have a subset of the means listed herein.

Device 101 is typically a satellite receiver for a data service from a high powered satellite such as Sirius Radio or XM Radio. It could also be future satellites such as those from Mobile Satellite Ventures (MSV). The advantage of satellite signals is that they can cover a very large geographic area for conveying the modified forward path. For Mobile Satellite Ventures, their architecture intends to use spot beams, albeit still covering a relatively large geographic area. Device 101 could also be a bi-directional satellite transceiver, meaning it could also transmit as well as receive from satellites.

Device 102 is a cellular transceiver. It could be multi-frequency mode, multi-access mode (GSM and CDMA), or it could be multi-air interface protocol such as 1xRTT and EVDO. Device 103 is a WiFi transceiver generally conforming to the "802" standards. Device 104 is a WiMax transceiver. WiMax networks are being deployed as of this filing and offer the advantage of wider area coverage (longer link distances) than does WiFi, which generally is considered and used for shorter distance communications. For either WiFi or WiMax, the communication is typically packet switched and uses versions of the IP protocol, albeit wirelessly. Device 105 is a very short range Bluetooth transceiver. Device 106 is some other communication means to include wired communications.

The output devices of end user device 100 are 114-116. Device 114 is a motion output device. This could be a shaker or something more sophisticated, such as that in the Wii™ video game controller. It is designed to provide physical and sensory feedback to the end user or end user device. Device 115 is a video display. The display is likely digital in nature and would provide a high resolution (a large number of pixels) image capable of displaying images, video, games, and the like. It is anticipated that end user device 100 could also communicate an image, video, or visual information via a short range means such as Bluetooth to a remote monitor or display. Device 116 is for audio output. It could be via speakers mounted on the end user device, via wired or wirelessly connected headphones, or via a Bluetooth connection to a remote sound system, for example.

Novel Video Display With Soft Keys And Soft Screen Partition

Figure 2:
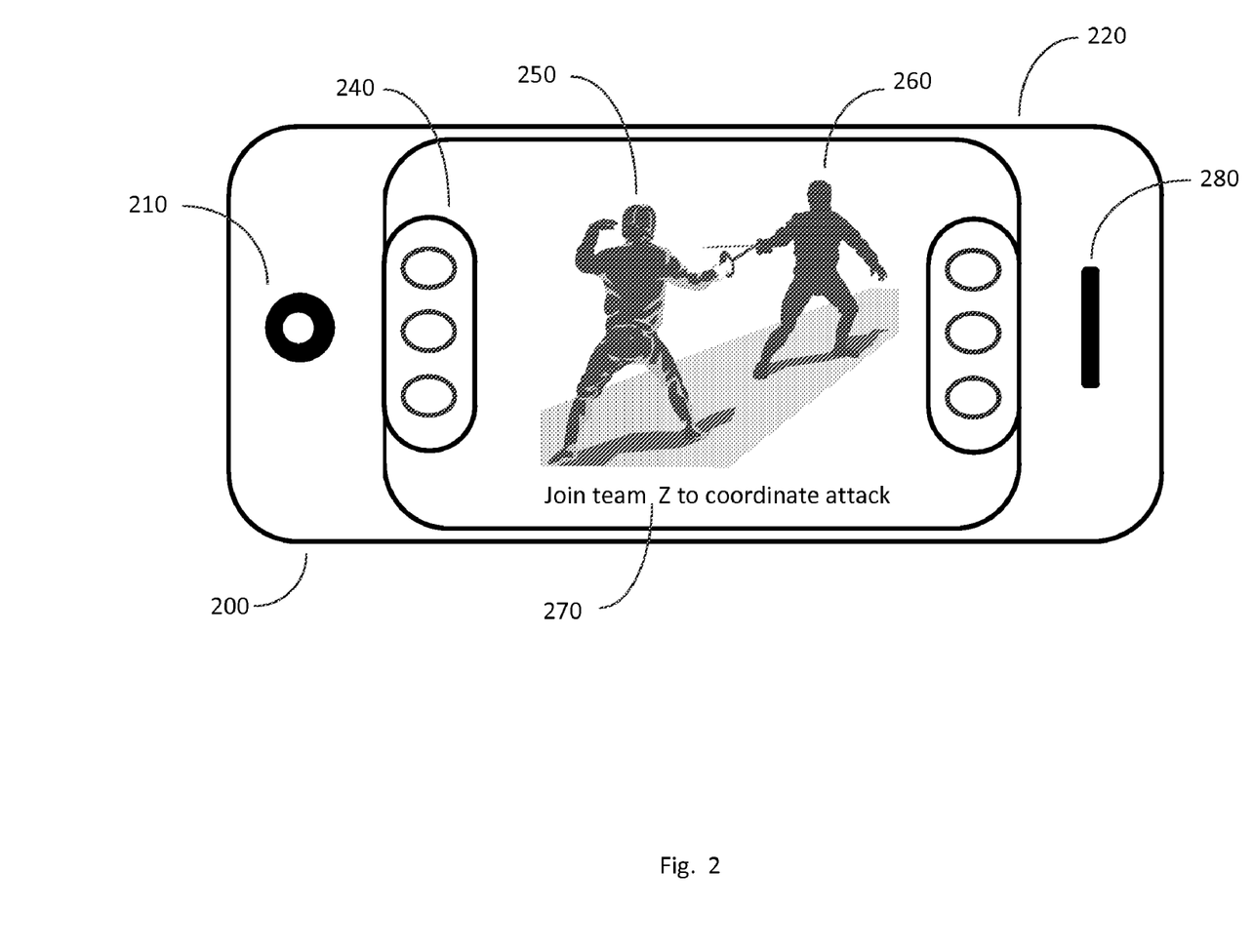
FIG. 2 illustrates a novel display paradigm for the end user device.

FIG. 2 illustrates a new and novel video display with soft keys and soft screen partition. Video device 200 is wireless capable and has building blocks defined in FIG. 1. The present Gaming Device For Multi-Player Games provides the end user with a private bidirectional link to the gaming site to enter their moves, to optionally receive private data from the gaming site to enable the end user's device to display private data that is hidden from the other players, and to communicate privately with another member or members of a subgroup. The Gaming Device For Multi-Player Games comprises a content display for displaying content that is transmitted to the plurality of end users on the unidirectional forward path, a plurality of controls for enabling an end user to generate data for transmission to at least one of the multicasting system and the plurality of end users, and a message display for displaying end user private communications received at the end user device.

A hard key is depicted as 210. Soft keys are game or application dependent and are shown as groups 230 and 240. Soft keys 230, 240 are displayed on the screen 220 and are activated by a given application's software. The subscriber (end user) touches the soft keys 230, 240 to enable some pre-defined action within a given game. Video display 220 embodies: the game display components 250 and 260, the "secret" subscriber display 270, and the soft keys 230 and 240. The video display can be two or more separate display devices or a single display device with independently operable segments (such as a split screen display).

The game display components 250 and 260 show the forward path modified game on a frame-by-frame basis as it is continuously updated. The "secret" subscriber display 270 is only seen by a given subscriber and is unique to that subscriber or that subscriber's team. Logically partitioned subscriber display 270 is also continuously updated. Not shown in FIG. 2 (but shown in FIG. 1), motion sensors can give the adaptive game controller another dimension of play wherein the subscriber shakes or moves the video device 200 to input motion into their response to a given game's condition. Similarly, the modified forward path video can also contain motion output which gives feedback to the subscriber on how a given action responded when all of the then connected multi-players respond (this is shown as 114 in FIG. 1). Finally, audio output, whether via headphones or a built-in speaker (this is shown as 280 in FIG. 2), provides an additional sensory output to the subscriber.

Not shown, it is also possible to have more traditional end user device physical implementation where the keys are hard and the device only has a "secret" end user display on it, for example. The main gaming display in this example is a computer screen or an HDTV.

SUMMARY

The gaming device for multi-player games operates in concert with a Gaming System With Reverse Path Feedback which enables feedback via the reverse path (end user device to network direction) from at least one of a plurality of end users who are capable of influencing, modifying, or changing the delivered multi-media content in the forward path (network to end user device direction) being delivered via a wireless multicast communication network.

The invention claimed is:

1. An end user gaming device for use in a multicasting system that has a unidirectional forward path to transmit content simultaneously to a plurality of end user gaming devices and a plurality of bidirectional communication paths, each separate from the unidirectional wireless forward broadcast path and unique to each of a corresponding one of the plurality of end user gaming devices, comprising:
    a content visual display configured to display content that is transmitted by the multicasting system, concurrently to the plurality of end user gaming devices and simultaneously received by each of the plurality of end user gaming devices, on the unidirectional forward path;
    a user input device that transmits end user private communications, input by the end user, on the bidirectional communication path to the multicasting system and to at least one of the plurality of end user gaming devices selected by the end user via the unique bidirectional communication path from the multicasting system that is associated with the selected end user gaming device; and
    a message display configured to display end user private communications originated by another of the plurality of end user gaming devices and received on the unique bidirectional communication path from the multicasting system.

2. The end user gaming device of claim 1 further comprising:
    a wireless transceiver for wirelessly interconnecting the end user gaming device with the bidirectional communication path.

3. The end user gaming device of claim 2 further comprising:
    a bidirectional communication path interface for connecting the user input gaming device and the message display to a reverse path and a forward path, respectively, of the bidirectional communication path to transmit data to and receive data from the multicasting system.

4. The end user gaming device of claim 3 wherein the user input device is connected to a reverse path of the bidirectional communication path to transmit data to the multicasting system.

5. The end user gaming device of claim 3 wherein the message display is connected to a forward path of the bidirectional communication path to receive data from the multicasting system.

6. The end user gaming device of claim 1 further comprising:
    a wireless transceiver for wirelessly interconnecting the content display with the unidirectional communication path.

7. The end user gaming device of claim 1 wherein the content visual display and the message display operate independent of each other.

8. The end user gaming device of claim 1 wherein the content visual display and the message display are independently operable segments of a single display device.

9. The end user gaming device of claim 1 wherein the user input device comprises:
    a soft key implemented on a one of the message display and the content visual display.

10. An end user gaming device for use in a multicasting system that has a unidirectional forward path to transmit content simultaneously to a plurality of end user gaming devices and a plurality of bidirectional communication paths, each separate from the unidirectional wireless forward broadcast path and unique to each of a corresponding one of the plurality of end user gaming devices, comprising:
    a content visual display configured to display content that is transmitted by the multicasting system concurrently to the plurality of end user gaming devices and received by each of the plurality of end user gaming devices on the unidirectional forward path;
    a plurality of user input devices that transmit end user private communications, input by the end user, on the bidirectional communication path to the multicasting system and to at least one of the plurality of end user gaming devices selected by the end user via the unique bidirectional communication path from the multicasting system that is associated with the selected end user gaming device; and
    a message display configured to display end user private communications originated by another of the plurality of end user gaming devices and received on the unique bidirectional communication path from the multicasting system.

11. The end user gaming device of claim 10 further comprising:
    a wireless transceiver for wirelessly interconnecting the end user gaming device with the bidirectional communication path.

12. The end user gaming device of claim 11 further comprising:
    a bidirectional communication path interface for connecting the plurality of user input devices and the message display to a reverse path and a forward path, respectively, of the bidirectional communication path to transmit data to and receive data from the multicasting system.

13. The end user gaming device of claim 12 wherein the plurality of user input devices are connected to a reverse path of the bidirectional communication path to transmit data to the multicasting system.

14. The end user gaming device of claim 12 wherein the message display is connected to a forward path of the bidirectional communication path to receive data from the multicasting system.

15. The end user gaming device of claim 10 further comprising:
   a wireless transceiver for wirelessly interconnecting the content visual display with the unidirectional communication path.

16. The end user gaming device of claim 10 wherein the content visual display and the message display operate independent of each other.

17. The end user gaming device of claim 10 wherein the content visual display and the message display are independently operable segments of a single display device.

18. The end user gaming device of claim 10 wherein the plurality of input devices comprises:
   a soft key implemented on a one of the message display and the content visual display.

* * * * *